Sept. 5, 1939.　　　　G. MATTERSDORF　　　　2,171,585
FRICTION BRAKE
Filed March 30, 1936　　　　5 Sheets-Sheet 2

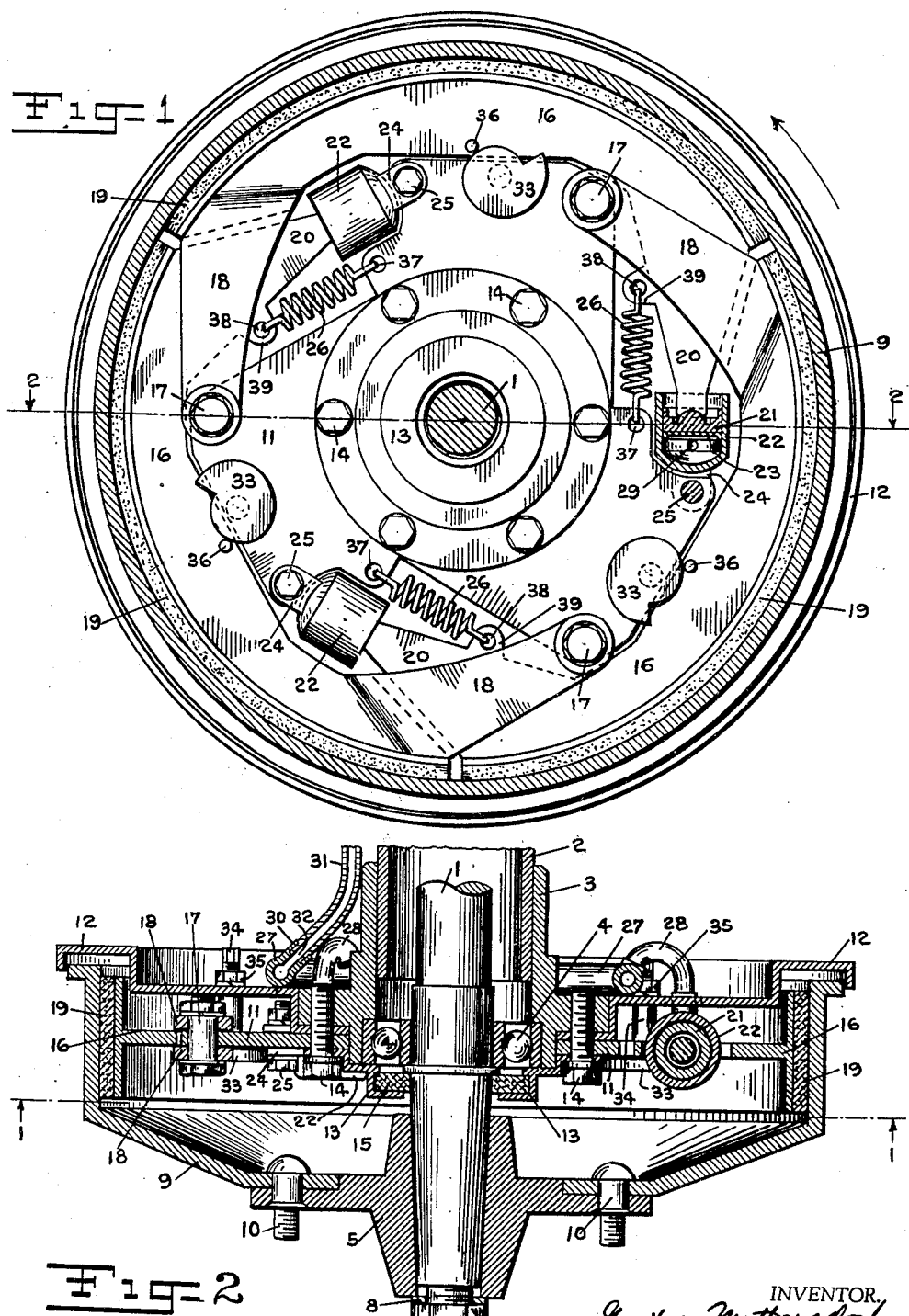

INVENTOR.
Gustav Mattersdorf
BY
ATTORNEY.

Sept. 5, 1939.   G. MATTERSDORF   2,171,585
FRICTION BRAKE
Filed March 30, 1936   5 Sheets-Sheet 3

INVENTOR.
Gustav Mattersdorf
BY Thompson & Hill
ATTORNEY.

Sept. 5, 1939.        G. MATTERSDORF        2,171,585
FRICTION BRAKE
Filed March 30, 1936          5 Sheets-Sheet 5

INVENTOR.
Gustav Mattersdorf
BY
ATTORNEY.

Patented Sept. 5, 1939

2,171,585

UNITED STATES PATENT OFFICE 2,171,585

FRICTION BRAKE

Gustav Mattersdorf, Lawrence, N. Y.

Application March 30, 1936, Serial No. 71,636

24 Claims. (Cl. 188—152)

This invention relates to friction brakes in general and, more particularly, to brakes for automotive vehicles.

The principal objects of the invention are to provide a brake which, with any given size of brake drum and any given initial actuating force, will produce a relatively high braking torque, particularly in forward motion, and which, in addition, will give an increased life of linings or maximum service between relinings, and which will require a minimum number of adjustments. A further object is to reduce or eliminate, from a practical viewpoint, brake drum distortion and the adverse effects thereof. This will also make it possible to use thinner brake drums which will not only effect a saving in weight and cost but, more important, will also effect a quicker dissipation of the heat generated in the drum when the brakes are applied. A further object is to provide a brake in which brake shoe curling or the tendency thereto is reduced to a minimum thereby mitigating or eliminating the adverse effects thereof, principally alternate "grabbing" and "fading." Another object is to provide a brake wherein the maximum available arcuate length of contact of the drum is made use of by being engaged by energy absorbing members thereby, among other advantages, increasing the service obtainable before relining is required while still retaining the advantages of brake shoes having relatively short contact arcs. A further object is to provide a brake in which all the forces acting are centered in one central plane in order to eliminate lateral stresses. Another object is to make full use of the principle of self-energization without subjecting the design to the disadvantages and shortcomings of so called "servo" types. A further object is to provide a brake possessing the advantages referred to above which will still be simple of construction and readily adaptable to all types of automotive vehicles. Other advantages and objectives will become apparent from a consideration of the specification and annexed drawings.

My invention comprises several species all of which have certain features in common. In one of the species, all the shoes are self-actuated in one direction of rotation of the brake drum. In another one of the species, more than half the total number of shoes but less than all are self-actuated in one direction of rotation of the brake drum. In still another one of the species, precisely one-half the total number of shoes are self-actuated in one direction of rotation of the brake drum. It should be noted that the embodiments hereinafter described merely represent the preferred forms of such species and are susceptible of various changes and modifications without departing from the basic principles involved and the spirit of the invention. The types outlined are likewise susceptible of various refinements without conflicting with the underlying principles.

Fig. 1 is a vertical face view of a three shoe brake mechanism embodying one application of my invention as applied to the left rear wheel of a motor vehicle, with the brake drum and axle in section and looking inwardly from the outside, and is substantially along the line 1—1 of Fig. 2.

Fig. 2 is a transverse horizontal section substantially along the line 2—2 of Fig. 1.

Figure 3:
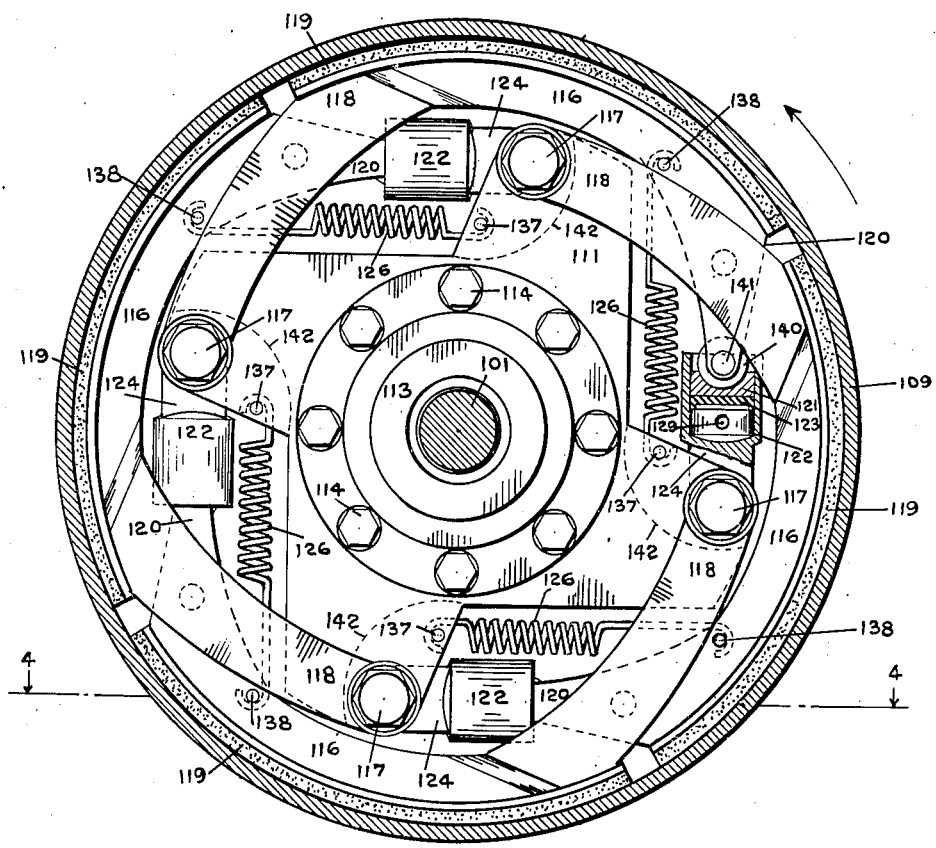
Fig. 3 is the same type of elevation as Fig. 1, except that it shows a four shoe brake mechanism embodying another application of my invention together with certain other mechanism not shown in connection with the three shoe type in Fig. 1. For the sake of clarity and simplicity certain other parts shown in Fig. 1 have been omitted from this figure.

In Figs. 1, 3, 5, 7 and 9, the arrow concentric with the drum indicates the direction of rotation of the drum corresponding to forward motion.

For the sake of simplicity, Figs. 1 and 2 illustrate one form of the invention as applied to a simple type of semi-floating rear axle assembly suitable for use with light automotive vehicles. For the sake of clarity and simplicity, certain parts not germain to the invention have been omitted. It should be understood that I do not limit myself to this type of construction as the invention could be applied as well to other types of semi-floating, three-quarter floating or full floating rear axles, or to front wheels, jackshafts, dead axles, propeller shafts, etc.

Similar numbers refer to similar parts throughout the drawings.

In Figs. 1 and 2; 1 is the axle shaft; 2 the inner member of the axle housing; 3 the outer member of the axle housing assembly which is securely attached by suitable means to the inner member; 4 is an anti-friction bearing which supports the axle; 5 is the wheel hub rotationally secured to the axle shaft by suitable means such as a spline or keyway and feathered key (not shown) and retained on the axle shaft by means of castellated nut 6 mounted on the outer threaded end of the axle shaft and prevented from turning by means of cotter pin 7. Between the nut 6 and the hub 5 is mounted the washer 8. 9 is the brake drum securely attached to the hub by means of combination rivets and bolts 10, the outer portions of which are threaded to provide a means for securing the road wheel (not shown) to the hub by means of suitable nuts (not shown). 11 is the brake support member or torque plate; 12 is the brake backing plate or cover plate, and 13 is the outer axle shaft bearing retainer, all three of which are securely attached to the outer axle housing member 3 by means of bolts 14. The bearing retainer 13 contains packing 15 to prevent seepage of bearing lubricant. 16 are the three brake shoes each of which is anchored or pivotally connected at one end to the torque plate 11 by means of studs 17 and their respective nuts and washers. These studs 17 pass through the torque plate 11 and through the respective forked heel ends or extensions 18 of the brake shoes. These extensions, comprising two parallel arms, may be integral with the main portion or body of the shoes as shown in the illustrations. The central portions of the shoes 16 are substantially in T section comprising a web or stem and a flange or sole to which latter are securely attached the lining or friction members 19 which may be fastened in the usual manner, as by rivets, the means for fastening not being shown. The brake shoes 16 also have toe ends or extensions 20 which are continuations of the shoe webs and which extend beyond the toe ends of the contact surfaces of their respective shoes and lie between the heel extensions 18 of their respective adjacent shoes. The extreme ends of these toe extensions 20 abut against the movable members or pistons 21 of fluid containing cylinders 22. To insure the pistons against leaks, piston cups 23 are provided. The cylinders 22 have extension arms 24 which straddle the torque plate. Through such extensions, the cylinders are pivotally connected to the torque plate 11 by means of studs 25 and their corresponding nuts and washers. 26 are retractor springs each of which is attached at one end to the torque plate through holes 37 and at the other end to its respective shoe through holes 38 in projections 39 of the said shoes, the purpose of these springs being to keep the shoes out of engagement with the drum when no actuating force is applied. 27 is an annular tube through which the actuating fluid courses; 28 are flexible tubings each of which is connected at one end to the annular tubing 27 and at the other end to its respective cylinder; 29 are cylinder ports to permit the fluid to pass into and out of the cylinders; 30 is a coupling extension on annular tubing 27 to which tubing 31 is connected which, in turn, either directly or indirectly, is connected with the master cylinder or other fluid pressure source. The port 32 in the tubing 27 permits the flow of fluid in either direction between the fluid pressure source and the individual cylinders. It will be noted that, through the various tubings, all the cylinders are, in effect, interconnected to enable them to function simultaneously. All the connections between the various tubings and between the tubings and the cylinders are tightly sealed to prevent leakage of fluid, the exact manner of such sealing not being shown. For the sake of clarity one of the cylinders and pistons is shown in section in Fig. 1, with the outer arm of the fastening extensions removed. The head of the corresponding anchor stud 25 is likewise cut away and its shank is shown in section. 33 are clearance adjustment cams integral with or securely attached to their respective shafts 34. Each of these shafts has a shoulder which abuts against the edges of a hole in the backing plate 12 and an extension which protrudes through this hole. A part of these extensions which protrude are threaded to receive lock nuts 35 and the rotational positions of these shafts and their respective cams are secured by means of such lock nuts 35 and their corresponding lock washers. The extreme ends of these cam shaft extensions are not threaded, but have hexagonal heads or ends the purpose of which is to permit the shafts and the cams attached thereto to be rotated to any desired position. 36 are stop pins secured to their respective brake shoes and which rest against the cams. It will be seen that when the brakes are applied, fluid (either liquid or gaseous) under pressure is simultaneously forced through the various connecting tubes 31, 27 and 28 into the various cylinders 22 causing their respective movable portions or pistons 21 to move outwardly. The pistons 21, acting on the various brake shoe extensions 20 (the ends of which abut against such pistons) actuate the shoes into contact with the brake drum 9, the force depending on the pressures acting on the pistons. This frictional contact serves to retard the rotation of the brake drums and parts connected therewith, such as the wheel, in the usual manner. When the brakes are released, the fluid pressure is decreased and the retractor springs 26 serve to bring the shoes back to their normal position out of engagement with the brake drum. The pistons 21 are likewise forced back to their normal position, causing the fluid to be returned toward its source or otherwise dissipated depending on the type of actuating mechanism employed.

A certain minimum clearance must be maintained between the drum and the shoes when the brakes are not applied. But as the lining wears this clearance will become larger and larger so that, eventually, with the usual type of fluid operating mechanism, the brake pedal or other operating device will have reached the end of its stroke without effecting sufficient contact pressure between the shoes and the drum. This is overcome by incorporating the cam clearance adjustment device heretofore referred to, the purpose of which is to limit the maximum drum to shoe clearance and to take up for wear. The method of adjustment is as follows: First, loosen lock nut 35, then rotate the camshaft 34 by means of its hexagonal end until the shoe drags against the drum; then back off until the wheel turns freely. While holding the cam shaft in this position, tighten the lock nut. Follow the same procedure on all the other shoes.

It will be noted that in the embodiment of the invention just described, all the shoes are pivotally connected in the same rotational direction so that in one rotational direction of the brake drum (preferably that corresponding to forward motion) all the shoes will be self-actuated and in the opposite rotational direction of the drum all the shoes will be non-self-actuated or will possess negative self-energization.

Figure 4:
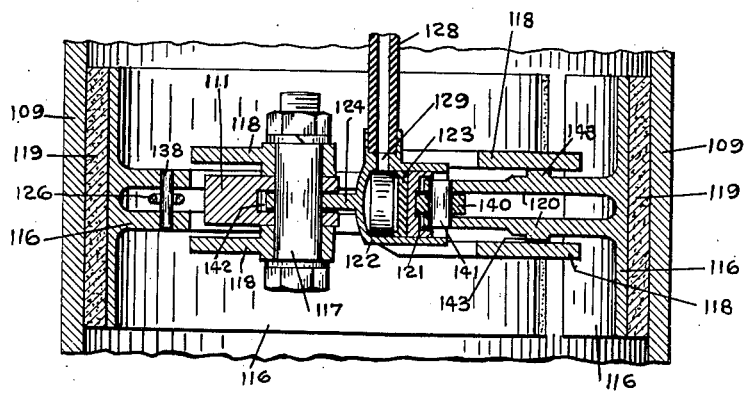
Fig. 4 is a transverse horizontal section substantially along the line 4—4 of Fig. 3.

In Figs. 3 and 4: 101 is the axle shaft and 109 is the brake drum. The brake support member or torque plate 111, and the outer axle shaft bearing retainer 113 are securely attached to the axle housing member or other fixed part (not shown) by means of bolts 114. 116 are the four brake shoes, the central portions or bodies of which are substantially in channel section comprising a double stem and a flange or sole to which latter are securely attached the lining or friction members 119. Each of the shoes has heel extensions 118 comprising two parallel arms which fork out or widen from the stem portions as shown. Each of the shoes is anchored or pivotally connected at the heel end to the torque plate 111 by means of studs 117 which pass through the heel extension arms 118 and through the torque plate as shown. The heel extensions 118 may be integral with the main portion or body of the shoes as shown in the illustrations. The shoes 116 also have toe extensions 120 which are continuations of the shoe stems and which comprise two substantially parallel arms which extend beyond the toe ends of the contact surfaces of their respective shoes and lie between the wider spaced heel extension arms 118 of their respective adjacent shoes. 143 are lateral projections on the toe extension arms 120 to permit the toe extensions to move with a substantially sliding fit within the heel extensions 118 of the adjacent shoes, thereby providing a means for guiding the toe ends of the shoes. At the extreme ends of these toe extension arms 120, are mounted rollers 140 which are held in place by means of pins 141 passing through the rollers and toe extension arms and permitting the rollers to rotate on such pins. As shown, a portion of the periphery of the rollers 140 abuts against the movable portion or pistons 121 of fluid containing cylinders 122. The surface of each piston 121 which engages the rollers has an arc of substantially the same radius as the outer periphery of the rollers and, when in engagement therewith, these arcs are concentric with the rollers. The purpose of this arrangement is to avoid strains on the pistons when the brakes are applied as well as to reduce friction and wear at the abutments. To prevent leaks, piston cups 123 are provided. The cylinders 122 have centrally located extension arms 124 which lie within centrally located grooves or channels 142 cut in the torque plate, the boundaries of such grooves being shown by dotted lines in Fig. 3. Through these cylinder extensions 124, the cylinders are pivotally connected to the torque plate by means of the same studs 117 whereby the shoes are anchored. 126 are retractor springs each of which is attached at one end to the torque plate 111 by means of pins 137 spanning the grooves 142 in the torque plate, and at the other end to its respective shoe by means of pins 138 which span the channel of the shoes. 128 is the flexible tubing connected to the cylinders and 129 are the cylinder ports. The various tubings connecting the several cylinders with the fluid pressure source are substantially the same as in Figs. 1 and 2 and are not shown. Through such tubings all the cylinders are, in effect, interconnected so as to function simultaneously so that, when the brakes are applied, all the shoes are simultaneously forced into frictional engagement with the drum and when released, the retractor springs serve simultaneously to withdraw the shoes from engagement with the drum.

It will be noted that in the embodiment of the invention just described, as in the previous embodiment, all the shoes are anchored in the same rotational direction so that in one rotational direction of the brake drum (preferably that corresponding to forward motion) all the shoes will possess positive self-actuation and in the opposite rotational direction of the drum all the shoes will possess negative self-energization.

Figure 5:
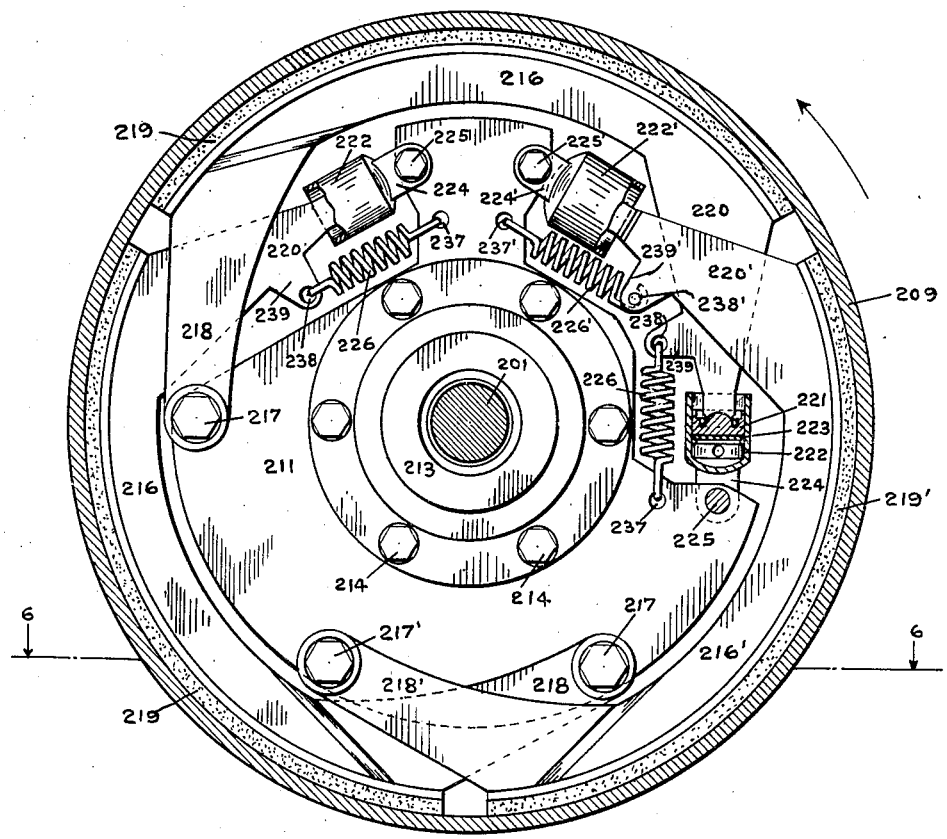
Fig. 5 is the same type of elevation as Fig. 1, but illustrates another embodiment of my invention as applied to a three shoe brake. As in Fig. 3, certain parts have been omitted from this illustration.
Figure 6:
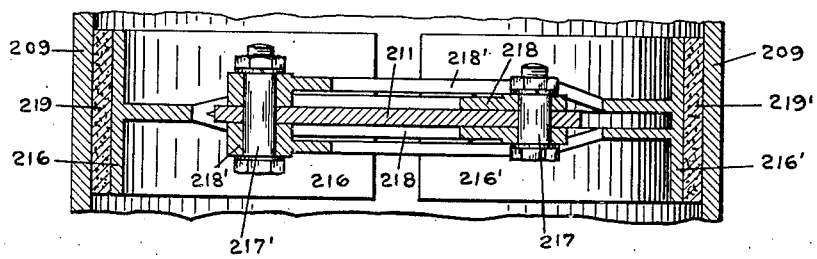
Fig. 6 is a transverse horizontal section substantially along the line 6—6 of Fig. 5.

In Figs. 5 and 6: 201 is the axle shaft and 209 is the brake drum. The brake support member or torque plate 211 and the outer axle shaft bearing retainer 213 are securely attached to the axle housing or other fixed part (not shown) by means of bolt 214. 216 are two similarly actuated brake shoes and 216' is an oppositely actuated brake shoe. The central portions or bodies of shoes 216 are substantially in T section comprising a web or stem and a flange or sole to which latter the lining or friction members 219 are securely attached. The central portion or body of shoe 216' is substantially in channel section comprising a double stem and a flange or sole to which latter the lining or friction member 219' is securely attached. Each of the shoes 216 has heel extensions 218 comprising two substantially parallel arms which fork out from the web or stem of the shoes. The shoe 216' likewise has a heel extension 218' comprising two parallel arms which fork out or widen from the double stem portion of the shoe as shown and which consequently are spaced wider apart than heel extension arms 218 of the other shoes, 216. Thus, heel extension arms 218' straddle heel extension arms 218 of its adjacent shoe. Each of the shoes is anchored or pivotally connected to the torque plate 211 by means of studs 217 and 217' which pass through the heel extension arms and through the torque plate as shown. The heel extensions 218 and 218' may be integral with the main portion or body of the shoe as shown in the illustrations. The shoes 216 also have toe extensions 220 which are continuations of the shoe webs and which extend beyond the toe ends of the contact surfaces of their respective shoes. On one shoe this toe extension 220 lies between the heel extension arms 218 of its adjacent shoe. The oppositely actuated shoe 216' also has a toe extension 220' which, being a continuation of such shoe's double stem, comprises two substantially parallel arms and it is between these arms that the toe extension 220 of the other shoe 216 lies. Extension arms 220' come together at their extreme ends so as to form one centrally located arm which abuts against the movable portion or piston of fluid containing cylinder 222', whereby it is actuated. Due to this overlapping construction, shoe 216' must be mounted first in assembling, after which the other two shoes 216 may be mounted. The extreme ends of the toe extensions 220 likewise abut against the movable portions or pistons 221 of fluid containing cylinders 222. To prevent leaks piston cups 223 are provided. The cylinders 222 have extension arms 224 which straddle the torque plate and the cylinder 222' has similar extension arms 224' and, in each case, through such extensions, the cylinders are pivotally connected to the torque plate 211 by means of studs 225, 225 and 225'. 226 are retractor springs each of which is attached at one end to the torque plate through holes 237 and at the other end to its respective shoe through holes 238 in projections 239 of the said shoes. 226' is the retractor spring for the oppositely actuated shoe and is attached at one end to the torque plate through hole 237' and at the other end to its shoe by means of pin 238' which spans the gap in projections 239' of toe extension arms 220'. The various tubings connecting the several cylinders with the fluid pressure source are substantially the same as in Figs. 1 and 2 and are not shown. Through such tubings all the cylinders are, in effect, interconnected to function simultaneously, so that, when the brakes are applied all the shoes are simultaneously forced into frictional engagement with the drum.

It will be noted that in the embodiment of the invention just described, two of the shoes are anchored in the same rotational direction and the third shoe is anchored in the opposite rotational direction so that in one rotational direction of the brake drum the former two shoes will be self-actuated and the latter shoe will be non-self-actuated, and in the opposite rotational direction of the drum, the former two shoes will be negatively self-actuated and the latter shoe will be the self-actuated shoe. It will also be noted from the drawings that I prefer to have the cylinder and piston which operate the single shoe which in forward motion is negatively actuated of larger diameter than the other two pistons and cylinders, the reasons for which will hereinafter be detailed.

Figure 7:
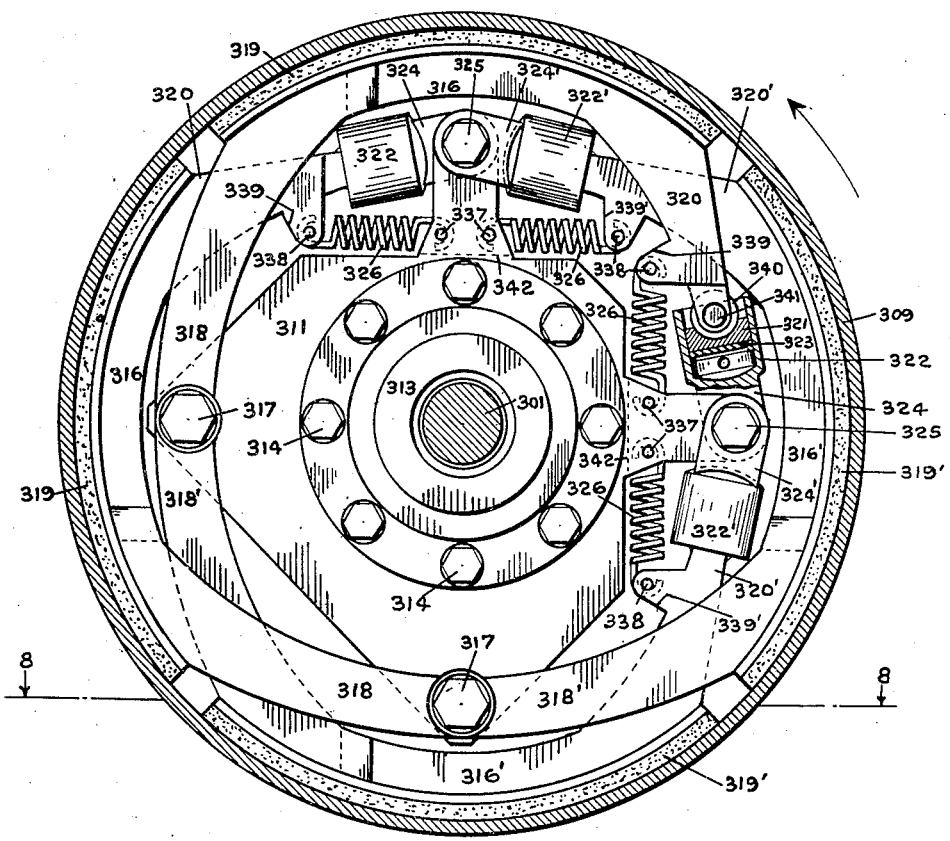
Fig. 7 is the same type of elevation as Fig. 1, but illustrates another embodiment of my invention as applied to a four shoe brake. As in Figs. 3 and 5, certain parts have been omitted.
Figure 8:
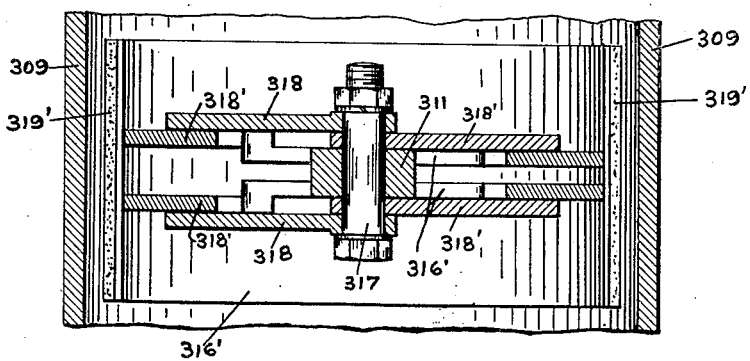
Fig. 8 is a transverse horizontal section substantially along the line 8—8 of Fig. 7.

In Figs. 7 and 8: 301 is the axle shaft and 309 is the brake drum. The brake support member or torque plate 311 and the outer axle shaft bearing retainer 313 are securely attached to the axle housing or other fixed part (not shown) by means of bolts 314. 316 are two similarly actuated brake shoes and 316' are two oppositely actuated brake shoes. In each shoe the central portions or bodies are substantially in channel section comprising a double stem and a flange or sole to which latter are securely attached the lining or friction members 319 and 319'. The double stem comprising the channel is spaced more widely apart in shoes 316 than in shoes 316'. Each of the shoes has heel extensions 318 and 318' comprising two parallel arms which fork out or widen from the stem portions as shown. Each of the shoes is anchored or pivotally connected at the heel end to the torque plate 311 by means of studs 317 each of which passes through the torque plate and through the heel extensions 318 of one forward acting shoe and 318' of one reverse acting shoe. These heel extensions 318 and 318' may be integral with the main portion or body of the shoes as shown in the illustrations, or they may be separate arms securely attached to such body or they may be in the form of links articulated with the brake shoes. The shoes 316 have toe extensions 320 and the shoes 316' have toe extensions 320' each such extension being continuations of the shoe stems and each comprising, therefore, two substantially parallel arms which extend beyond the toe ends of the contact surfaces of their respective shoes. The toe extensions 320 are spaced more widely apart than toe extensions 320'. Similarly, the heel extensions 318 are spaced more widely apart than heel extensions 318'. This arrangement provides for the overlapping construction shown in the drawings. At the extreme ends of toe extension arms 320 and 320' are mounted rollers 340 which are held in place by means of pins 341 passing through the rollers and toe extension arms and permitting the rollers to rotate on such pins. As shown, a portion of the periphery of the rollers 340 abuts against the movable portions or pistons 321 of fluid containing cylinders 322 and 322'. The surface of each piston 321 which engages the roller has an arc of substantially the same radius as the outer periphery of the rollers and, when in engagement therewith, these arcs are concentric with the rollers. The purpose of this arrangement is to avoid strains on the pistons when the brakes are applied as well as to reduce friction and wear at the abutments. To prevent leaks, piston cups 323 are provided. The cylinders 322 have centrally located extension arms 324 which lie within centrally located grooves or channels 342 cut in the torque plate, the boundaries of such grooves being shown by dotted lines in Fig. 7. The cylinders 322' have parallel extension arms 324' which straddle the torque plate. Through these extensions, the cylinders are pivotally connected to the torque plate by means of studs 325, each stud connecting one of the cylinders 322 and one of the cylinders 322'. 326 are retractor springs each of which is attached at one end to the torque plate by means of pins 337 spanning the grooves 342 in the torque plate, and at the other end to its respective shoe by means of pins 338 which span the gaps in the projections 339 and 339' of the shoes 316 and 316' respectively. The various tubings connecting the several cylinders with the fluid pressure source are substantially the same as in Figs. 1 and 2 and are not shown. Through such tubings all the cylinders are, in effect, interconnected to function simultaneously so that, when the brakes are applied, all the shoes are simultaneously forced into frictional contact with the drum.

It will be noted that in the embodiment just described, two of the shoes are anchored in one rotational direction and the other two shoes are anchored in the opposite rotational direction so that in one rotational direction of the drum two of the shoes will be self-actuated and the other two shoes will be negatively self-actuated.

In the opposite rotational direction of the drum the former shoes become negatively self-actuated and the latter shoes become the self-actuated shoes.

Figure 9:
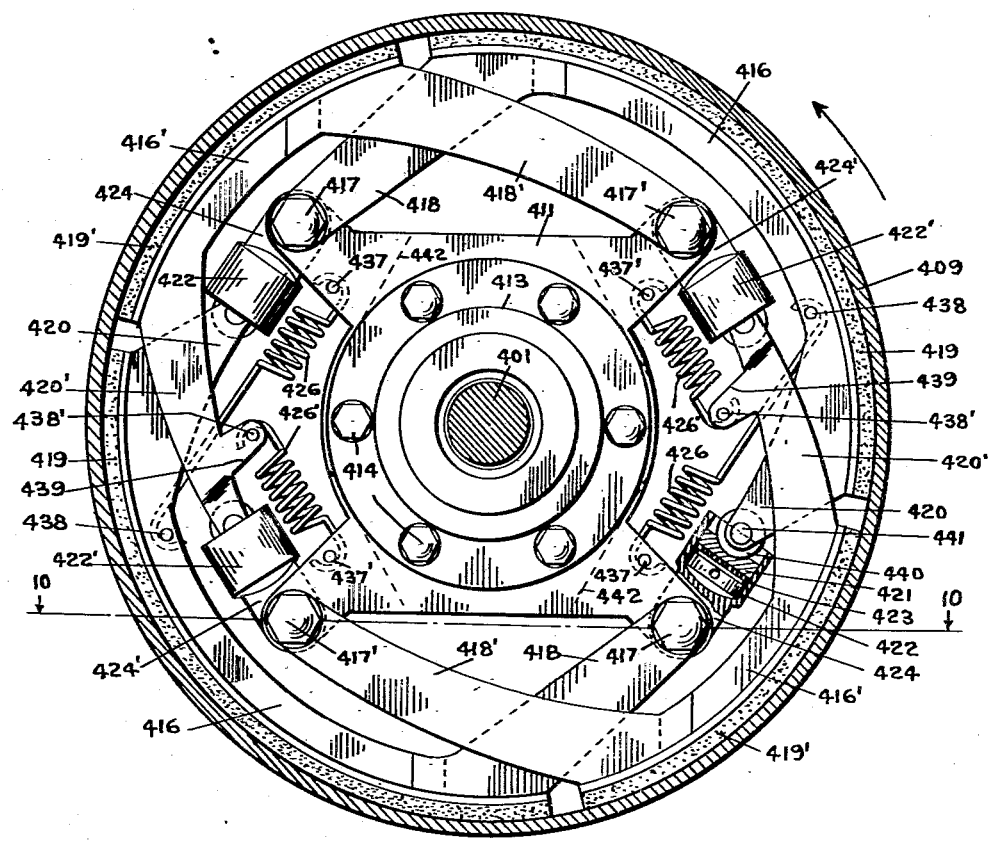
Fig. 9 is the same type of elevation as Fig. 1, but illustrates still another embodiment of my invention as applied to a four shoe brake. As in Figs. 3, 5 and 7, certain parts have been omitted.
Figure 10:
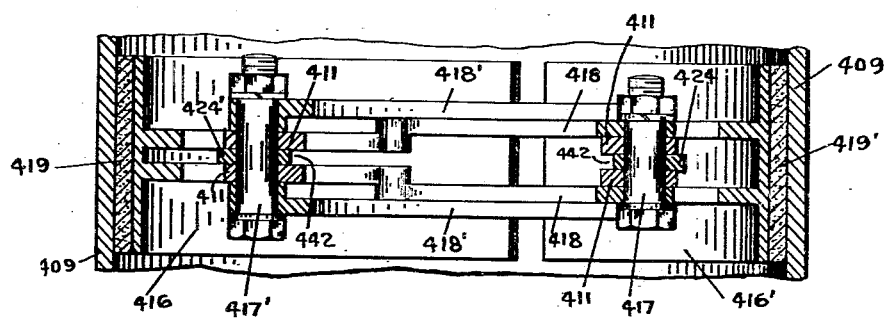
Fig. 10 is a transverse horizontal section substantially along the line 10—10 of Fig. 9.

In Figs. 9 and 10: 401 is the axle shaft and 409 is the brake drum. The brake support member or torque plate 411 and the outer axle shaft bearing retainer 413 are securely attached to the axle housing or other fixed part (not shown) by means of bolts 414. 416 are two similarly actuated brake shoes and 416' are two oppositely actuated brake shoes. The arcuate lengths of the contact surfaces of shoes 416 are longer than the arcuate lengths of the contact surfaces of shoes 416'. In each shoe the central portions or bodies are substantially in channel section comprising a double stem and a flange or sole to which latter are securely attached the lining or friction members 419 and 419'. The double stem comprising the channel is spaced more widely apart in shoes 416' than in shoes 416. Each of the shoes has heel extensions 418 and 418' which fork out or widen from the stem portions as shown. Each of the shoes is anchored or pivotally connected at its respective heel end to the torque plate 411 by means of studs 417 and 417' each of which passes through the torque plate and through the heel extensions 418 and 418' of shoes 416 and 416' respectively. These heel extensions 418 and 418' may be integral with the main portions or bodies of the shoes as shown in the illustrations. The shoes 416 have toe extensions 420 and the shoes 416' have toe extensions 420' each such extension being continuations of the shoe stems and each comprising, therefore, two substantially parallel arms which extend beyond the toe ends of the contact surfaces of their respective shoes. The toe extensions 420' are spaced more widely apart than the toe extensions 420 and the former therefore straddle the latter as shown. Similarly, the heel extensions 418' are spaced more widely apart than the heel extensions 418 and the former therefore straddle the latter as shown. Due to this overlapping construction, the shoes 416' must be mounted first in assembling after which the shoes 416 may be mounted. At the extreme ends of toe extension arms 420 and 420' are mounted rollers 440 which are held in place by means of pins 441 passing through the rollers and toe extension arms and permitting the rollers to rotate on such pins. As shown, a portion of the periphery of the rollers 440 abuts against the movable portions or pistons 421 of fluid containing cylinders 422 and 422'. The surface of each piston 421 which engages the roller has an arc of substantially the same radius as the outer periphery of the rollers and, when in engagement therewith, these arcs are concentric with the rollers. The purpose of this arrangement is to avoid strains on the pistons when the brakes are applied as well as to reduce friction and wear at the abutments. To prevent leaks, piston cups 423 are provided. The cylinders 422 and 422' have centrally located extension arms 424 and 424' respectively which lie within centrally located grooves or channels 442 cut in the torque plate, the boundaries of such grooves being shown by dotted lines in Fig. 9. Through these extension arms the cylinders are pivotally connected to the torque plate by means of the same studs 417 and 417' whereby the shoes are anchored. 426 are retractor springs each of which is attached at one end to the torque plate by means of pins 437 which span the grooves 442 in the torque plate and at the other end to its respective shoe 416 by means of pins 438 which spans the channel of the shoes. 426' are retractor springs for the shoes 416' and each of these is connected at one end to the torque plate by means of pins 437' which span the grooves 442 in the torque plate and at the other end to its respective shoe by means of pins 438' which spans the gap in the projection 439 of the said shoes. The various tubings connecting the several cylinders with the fluid pressure source are substantially the same as in Figs. 1 and 2 and are not shown. Through such tubings, all the cylinders are, in effect, interconnected to function simultaneously so that, when the brakes are applied, all the shoes are simultaneously forced into frictional engagement with the drum.

It will be noted that in the embodiment just described two of the shoes are anchored in one rotational direction and the other two shoes are anchored in the opposite rotational direction so that in one rotational direction of the drum two of the shoes will be self-actuated and the other two will be negatively self-actuated. In the opposite rotational direction of the drum the former shoes become the non-self-actuated shoes and the latter shoes become the self-actuated shoes. It should also be noted, however, that in one direction of rotation of the drum, preferably that corresponding to forward motion, the two shoes which are self-actuated have longer arcs of contact than the non-self-actuated shoes, the purpose of which will be hereinafter explained.

In friction brakes comprising a brake drum and a brake shoe or shoes anchored or pivotally connected to a fixed member, the braking torque due to any given shoe for any given actuating force, will be greater in one direction of rotation of the brake drum than in the opposite rotational direction thereof. In an internal shoe brake, this torque will be greater when the rotation tends to carry the brake shoe against its point of anchorage and less when the rotation tends to carry the shoe away from its point of anchorage. In the first case, the frictional forces acting on the shoe assist the actuating forces, which press it into contact with the drum, thereby increasing the shoe to drum pressure and the shoe is then said to be an assisted shoe or one possessing positive self-energization or positive self-actuation or is said to be self-energized or self-actuated. In the second case, the frictional forces oppose the actuating forces and the shoe is said to be an opposed shoe or one possessing negative self-energization or negative self-actuation or is said to be negatively or non-self-energized or negatively or non-self-actuated. The degree of self-energization of a shoe depends on the shoe characteristics as hereinafter defined and to some extent also upon the rigidity of the parts.

It should be noted that, throughout the various embodiments portrayed, I prefer to use substantially symmetrical shoes, such shoes being advantageous from the viewpoint of torque development and uniformity of wear. As herein used, the term "symmetrical shoe" is exclusively used to denote a brake shoe wherein a brake drum radius drawn at right angles to a brake drum diameter passing through the pivot axis of the shoe, or the normal radius of the shoe, divides the contact surface of such shoe into equal arcs. The term may also be defined as a brake shoe wherein the heel angle plus the toe angle equals 180°. The heel angle of a shoe is the angle subtended by two brake drum radii, one passing through the pivot axis and the other passing through the heel end of the contact surface of the shoe. The toe angle is the angle subtended by two brake drum radii, one passing through the shoe's pivot axis and the other passing through the toe end of the contact surface of the shoe. The toe end of a shoe is the free end and the heel end is the pivoted end.

The term "symmetrical shoes" should not be confused with the term "similar shoes." The latter does not necessarily refer to similarity of construction but, in general, refers to shoes possessing similar characteristics. The characteristics of a shoe are its heel angle, its toe angle, the coefficient of friction of its contact surface and its pivot axis ratio, the latter being the ratio between the distance from its pivot axis to the drum axis, and the drum radius. It will be seen, therefore, that two or more shoes may be symmetrical but not similar and, on the other hand, two or more shoes may be similar but not symmetrical. It should be noted, therefore, that in Figs. 1, 3, 5 and 7, I prefer to use substantially similar shoes regardless of the direction in which they are actuated. In Fig. 9, where two pairs of shoes are employed, I prefer to have both members of a similarly actuated pair substantially similar but dissimilar from members of the other pair. It should also be noted that in Figs. 1 and 3, I prefer to have all the shoes not only substantially similar, but also substantially identical in construction so as to be interchangeable.

It should also be noted that, throughout the various embodiments portrayed, I prefer to use brake shoes having relatively short contact arcs, preferably no more than 120°. Shoes having long contact arcs have numerous disadvantages. First of all, for any given minimum clearance a long shoe requires more motion to actuate it which means either a larger pedal stroke or a decrease in mechanical advantage. Also, long shoes are, in general, more subject to brake shoe curling, hereinafter discussed. Furthermore, the longer the shoe, the more disproportionate becomes the wear of its lining throughout its contact length. Also, on an assisted shoe, the portions nearer the toe end have larger frictional moments and are, therefore, more highly self-energized. Inasmuch as the shoes are generally somewhat flexible, by increasing the contact length toward the toe, a point could easily be reached where, with ordinary coefficients of friction, the shoe would become grabby or would tend to lock.

It should also be noted that, throughout the various embodiments, I prefer to use brake shoes whose aggregate contact lengths are about equal to 360°, less suitable allowance for clearances between shoes for the purpose of freedom of motion, for structural considerations and for facility of assembling and dismounting. By so doing I make full use of the whole available drum circumference. It should be noted that, in order to accomplish this while at the same time employing shoes having relatively short contact arcs, at least three shoes are required.

I also prefer to use fluid actuating means throughout and, more particularly, I prefer to use pivotally mounted fluid actuating means. The term "fluid" is herein used in its true physical sence and is therefore intended to include both liquids and gases.

It should also be noted that throughout the embodiments portrayed, the heel extension arms of the various shoes, instead of being securely attached to or integral with the central portions or bodies of the shoes as shown, may be in the form of links articulated at one end with the shoes and anchored or pivotally connected at the other end to the torque plate or fixed member. In such case the shoes are still to be considered as anchored or pivotally connected to the fixed member and within the meaning of the terms as herein used.

In brakes employing two oppositely acting shoes and a floating double surface cam of equal lift or a double hydraulic cylinder of uniform bore, the pressure along one radius of the drum is greater than along any other radius resulting in unidirectional brake drum distortion when the brakes are applied. In brakes of the same type but employing a double cam of equal lift mounted on a fixed journal and similar shoes, there are two points of maximum pressure approximately diametrically opposite resulting in two-directional drum distortion. There are limits in each case beyond which this distortion cannot be permitted and the drums must therefore be made rather heavy commensurate with the pressures developed and, in general, the thicker the drum, the less effective are its heat dissipating qualities. It will be seen, therefore, that to avoid such distortion, there preferably should be at least three points or radii of maximum pressure along the circumference of the drum preferably equidistant from each other, and in order to accomplish this, it will be seen, that at least three shoes are required.

When, in any friction brake, the shoes are forced into contact with the drum, heat is developed, inasmuch as the major part of the energy of the vehicle or machine to be braked must be transformed into heat in the braking parts. The source of this heat is in the contact surfaces between the shoes and the drum whence it is dissipated out through the drum and in through the shoes and adjacent parts. Regardless of the length or number of shoes employed, the drum, since it rotates, has a practically uniform temperature throughout its circumference. The heat passing in to the shoes is due to the heat developed at its respective contact points and also to heat received from the drum. Inasmuch as the lining is a poor heat conductor, it will be seen, therefore, that the heat absorbed by a shoe is to a great extent dependent on the braking torque developed by the shoe. If one 118° shoe develops for example, 75% of the total torque, more heat will be transmitted to it than would be transmitted to each of three similar 118° shoes which, in a similar brake, together develop the same aggregate torque and each of which develops a fairly proportionate part of the total torque. This is important because of the adverse effects of brake shoe curling.

When the brakes are applied, the outer periphery of each shoe becomes hotter than the inner portions due to which the metal at the outer periphery expands more causing the shoe to curl up to some extent. This curl is resisted and overcome to some extent by the actuating force and the more remote the point on the shoe where the actuating force is applied is from the point of anchorage, the greater will be the resistance to this curling. Quite apart from considerations of leverage, etc., it is advisable, therefore, to have the point where the actuating force is applied at or beyond the toe end of the lining. When the shoe curls, the toe is brought away from the drum and continued application of the brakes will result in what is known as heel contact. Since in an assisted shoe, the actuation is less at the heel this results in what is known as "fade-out"; that is, for the same pedal effort a much smaller braking torque is developed and due to the resultant high pressure to stop the machine, the heel quickly wears away while hardly any wear takes place at the toe. When the brake is released the shoe cools off and returns to its original shape but the drum to shoe clearance is now proportionately greater at the heel than at the toe and when the brakes are again applied the shoes will make contact only at the toe ends. Due to the high degree of self-actuation at the toe, the brakes will become "grabby" or tend to lock until the toe portion is worn down to the heel level or until curling again takes place. This "fade-out" and "grab" will repeat itself indefinitely unless means are employed to mitigate or overcome it. If, however, instead of using, say, two 118° oppositely acting shoes where the forward shoe develops about 75% of the total torque, we use three 118° shoes each of which develops one-third or, at least, a more proportionate part of the total torque, the tendency toward curling is very greatly reduced. It will also be seen that the longer the contact surfaces of the shoes or the further such contact surfaces are extended toward the toe the more "grabby" the shoes will become due to the effects of curling and the greater are the possibilities of their becoming self-locking, inasmuch as the further we proceed from the pivot axis the larger are the frictional moments (in an assisted shoe) and the more highly actuated, therefore, this portion of the shoe becomes. This is another disadvantage of long shoes.

It should also be noted that an increase in heat will frequently affect the coefficient of friction of the lining, in some cases to a very appreciable extent. Therefore, the more uniformly the aggregate torque is developed throughout the drum circumference, the less heat is developed per unit lining area and the less will be the tendency for the frictional coefficient to vary due to such heat. In other words, with, for example, three shoes, each subtending substantially one-third of the drum circumference and each developing a fairly proportionate part of the total braking torque, there will be less of a tendency toward variation in coefficient of friction than would be the case with, for example, one shoe which subtends approximately one-third of the circumference and which develops about 75% of the same total torque. This is another advantage of my invention.

It should also be noted that, throughout the embodiments portrayed, I prefer to use a fixed member or brake support member which is centrally located, that is, a fixed member so disposed that a plane bisecting the width of the lining will also bisect the width of the fixed member or torque plate. I also prefer to have the shoes symmetrically disposed laterally about this central plane so that there are two anchorage bearings, one on each side of the said fixed member, the two bearings being symmetrically disposed about the centrally located fixed member or torque plate. I also prefer to have all the forces acting centered at the mentioned central plane, that is, the axes of the fluid actuating mechanisms are located in this plane so that the actuating forces are centered therein and the retractor springs are likewise centered therein so that the retracting forces are centered in such central plane. I prefer to do all of the above in order to avoid lateral stresses and consequent strain on the parts and in order to conserve the applied forces to the fullest extent without diminution, and also to obviate the necessity of guiding devices for the shoes.

It should also be noted that, throughout the embodiments, I prefer to have the toe extensions of the shoes operate either between the heel extensions of an adjacent shoe with a substantially sliding fit between them or to have the toe extensions operate between the toe extensions of an adjacent shoe, likewise with a substantially sliding fit between them. I prefer to do this in order to render the shoes self-guiding thereby further obviating the necessity for any separate guiding means for the shoes although even this procedure is hardly necessary where the shoes are symmetrically disposed about a central plane as mentioned above, especially if the anchor bearings are fairly widely spaced.

It should also be noted that, throughout the embodiments, I prefer to have the axis of the actuating means in such a direction that the actuating force will be applied in a direction at right angles to the lever arm of the shoe measured from the point of actuation to the pivot axis. In other words, the actuating force produces a torque on the brake shoe about its pivot axis and, in order that the actuating force may be most effective, its direction should correspond as nearly as possible with a line tangential, at the point of actuation on the shoe, to the arc of a circle centered at the pivot axis and passing through such point of actuation. In this direction the lever arm of the actuating moment is longest and the torque will be at its maximum. In those embodiments where rollers, mounted between the actuating means and the shoes, are employed, the point of actuation is deemed to be the axis of the roller. Where no rollers are employed, the point of actuation is deemed to be the center or axis of the curved abutment surfaces of the shoe and the piston, which in the drawings are spherically curved. In order to accomplish this it is not imperative that pivotally mounted actuating means be employed but such pivotal means have the advantage that they are able to accommodate themselves to changes in direction as the brakes are applied and as the lining wears. They also have the advantage, particularly when combined with the roller idea portrayed, that they greatly reduce or practically eleminate strains on the pistons due to the relative motion between the abutment surfaces as the brakes are applied and due likewise to such motion caused by brake shoe elongation or deformation, such as curling, because of heat, or deformation because of flexibility of the shoe. Thus, the pivotally mounted cylinders can accommodate themselves to changes in direction due to such shoe deformations. I would prefer to use rollers throughout all the embodiments, they having been omitted in the embodiments portrayed in Figs. 1 and 5 for the sake of simplicity. The advantage of such rollers resides not only in the fact that they eliminate strains on the pistons but also in that, while so doing, they also afford a relatively large abutment area through which the actuating force may be applied to the shoe, all of which is accomplished with a minimum of frictional loss and while maintaining facility of assembling and dismounting.

It should also be noted that I prefer to have the axis of the stud or pivotal support of the actuating cylinders in line with the axis of such cylinders, in order that the reaction to the actuating force produced by such actuating mechanisms will pass through the pivot axis. If the pivot axis were to one side, the reaction would tend to cause the cylinders to swing or rotate about their respective pivot axes, which would be detrimental to the action desired.

In considering the various embodiments in greater detail, it should be noted that, in designing a brake, three principal objectives should be striven for: to develop a maximum braking torque for a given diameter of drum; to produce this torque with a minimum of operating effort; and to obtain a maximum of service from the lining material. From a purely theoretical point of view the width of the lining plays no part in determining the torque developed. In other words, theoretically, if everything else remained equal, increasing the width of the lining would result in no greater torque but would lengthen the life of the lining material as it would effect less wear per unit area due to the distribution of force over a greater area with a consequent decrease in pressure, and theoretically, therefore, everything else being equal, the rate of wear would be inversely proportional to the width of the lining. From a practical viewpoint, however, all other things remaining equal, increasing the width of the lining will usually result in some increase in torque up to a certain point, which increase, however, will not be proportional to the increase in width. Among the reasons why, everything else being equal, an increase in torque will usually result from increasing the width of the lining (assuming proper construction) are that, since the drum is wider less heat is developed per unit area resulting in less brake drum expansion and, since the lining is wider, the pressure is decreased resulting in less brake drum distortion and less heat per unit area is developed on the periphery of the shoes resulting in less brake shoe deformation. In comparing the various embodiments with the potentialities of conventional types the factor of width will be disregarded and equal lining widths and drum diameters will be assumed.

In comparing the embodiment portrayed in Fig. 1 with a conventional type of brake employing two similar though opposed shoes, both equally actuated by means of a double opposed fluid cylinder or a floating double surface cam and assuming the same size of drum, the same aggregate actuating force and the same shoe characteristics in both types, it can readily be shown that the torque developed in forward motion would be considerably more in my type than in the conventional type, although somewhat less in reverse motion, the degree depending on the particular shoe characteristics employed. With the usual characteristics employed in the conventional type, the self-actuated shoe produces about 75% of the total torque and is subject, therefore, to about 75% of the total lining wear or, allowing for reverse braking, the forward shoe sustains about 70% of the total wear and requires both adjustments to compensate for wear and relining about twice as often as the reverse shoe. In my type as shown in Fig. 1, each shoe develops one-third of the total torque and is subject, therefore, to one-third of the total wear, regardless of the direction of rotation. Allowing for reverse braking, my type will afford more than twice as much service before any relining is required and will require adjustments to compensate for wear less than half as often, with the characteristics usually employed. It should be particularly noted that, in my types depicted in Figs. 1 and 3, by somewhat modifying the design, the pivot axis ratio can be increased to about .8 to .9, depending on the lining thickness, without sacrificing rigidity of the shoes, thereby providing a more equitable ratio between forward and reverse braking.

The four shoe embodiment depicted in Fig. 3 will afford a greater forward torque than the conventional type above referred to, assuming the same pivot axis ratio and coefficient of friction, but will not be quite as advantageous in this respect as the three shoe type shown in Fig. 1. However, it possesses certain advantages over the latter type which might render it more suitable for certain types of vehicles.

It should be noted that the species depicted in Figs. 1 and 3 wherein all the shoes are anchored in the same rotational direction may be designed with any number of shoes, the limits being structural considerations. The actual number to be employed will depend on the results desired to be achieved.

Considering the embodiment depicted in Fig. 5, it will be noted that I prefer to have the cylinder and piston which operate the single shoe which in forward motion is negatively self-actuated of larger diameter than the other two pistons and cylinders, my reasons being that if the cylinders were all of equal diameter so as to divide the actuating force equally between the three shoes, the total braking torque produced in reverse motion would be considerably less than the total braking torque produced in forward motion with any given aggregate actuating force and, in addition, such an arrangement would not be as effective in overcoming brake drum distortion nor would the wear on the various shoes be anywhere near uniform. This can be overcome by apportioning the aggregate actuating force in a different manner instead of equally between the three shoes, which can readily be accomplished by varying the relative diameters of the fluid cylinders and pistons. By increasing the relative diameter of the piston actuating the reverse shoe so as to impart more force to it than to either of the two forward shoes, all three shoes can be made to produce equal torques in forward motion, or the actuating force can be so distributed that equal aggregate braking torques will result in both forward and reverse motions.

Should it be desired to have all the shoes, whether self-actuated or not, develop equal torques in forward motion, a suitable apportionment or distribution of the aggregate actuating force to accomplish this result might be determined, and the areas of the respective pistons can then be apportioned accordingly. The apportionment will depend on the particular shoe characteristics employed and no general rule can therefore be laid down. It may be said, however, that this procedure will in general result in a greater aggregate torque in reverse motion than in forward motion for the same aggregate actuating force (unless linings of relatively low frictional coefficients are used), a result which is not to be commended. Likewise, unless low coefficients are used, the forward torque would be less than in a 2 shoe conventional type of similar characteristics and the reverse torque greater. In this contemplated design, if only forward motion were considered, the linings would wear equally and the tendency toward drum distortion would also effectively be overcome as there would be three points of equal maximum pressure substantially angularly equidistant from each other. But in reverse motion, the single reverse shoe would produce a much greater torque than either of the forward shoes and would wear much more rapidly and, in the aggregate, the wear would not be quite uniform.

In view of the above, I prefer therefore, in the embodiment depicted in Fig. 5 to have the aggregate torque in reverse motion equal to the aggregate torque produced in forward motion for any given aggregate actuating force. By so doing an exceedingly desirable result is accomplished for, not only are the forward and reverse torques equal, but they are equal to the forward and reverse torques produced with a conventional two opposed shoe brake of the type described above employing shoes of similar characteristics and with the same actuating force, and, in addition, the lining life is very greatly increased as will subsequently be shown. Also, this type has numerous other advantages over the conventional type as will be explained. It will be apparent that, in order to accomplish this result in any brake employing three similar shoes, wherein two shoes are assisted and one opposed in one rotational direction of the drum, the equivalent actuating force on the one opposed shoe must be equal to the equivalent actuating forces on the two assisted shoes combined, and the actuating forces on these latter shoes should be equal so that, it may be said that, the equivalent actuating force on the opposed shoe must be twice as great as on either of the assisted shoes. Assuming that all the shoes are actuated at similar respective places on such shoes and that the individual actuating forces are applied in similar directions with respect to each shoe, all as shown in Fig. 5, then it may be said that, in order to accomplish this preferred result, the area of the piston acting on the reverse shoe must be twice as large as the area of either one of the pistons acting on the assisted shoes and equal to the combined areas of such latter pistons. In other words, in a three shoe brake of the type described, the radius of the larger piston should equal the radius of one of the smaller pistons multiplied by the square root of 2.

It should be noted that in this preferred embodiment, the torques produced in forward motion by the individual shoes are generally not exactly equal (unless low frictional coefficients are used) and if forward motion only were considered, the two forward shoes would wear down somewhat sooner than the one reverse shoe. But in reverse motion, the torque and consequent wear of the reverse shoe is very much greater than that of the forward shoes. In the aggregate, therefore, considering both directions of travel, since the reverse shoe wears somewhat less during the great number of times the brake is employed in forward motion and a great deal more during the comparatively few times it is used in reverse motion, the shoes on the whole will wear almost equally. In forward motion, since there is no very great disparity between the torques and, therefore, the pressures exerted by the various shoes (in comparison with the disparity inherent in conventional types) brake drum distortion is very effectively overcome and in reverse motion brake drum distortion is usually not so important a factor as usually no very great pressures are developed, although, even in reverse, distortion is more effectively overcome than in conventional types. Of greatest importance is the fact that, as can readily be shown, this preferred type will afford twice the service before adjustments or relining are required as compared with a conventional type employing shoes of the same characteristics. This can readily be understood by considering that, in the conventional type referred to, the forward shoe receives one-half the total actuating force, whereas in the preferred embodiment of the above type, each forward shoe receives one-quarter of the total actuating force. Thus, assuming as above the same shoe characteristics in both types and the same aggregate actuating force, it will readily be seen that each forward shoe of the preferred type develops precisely one-half the torque of the one forward shoe of the conventional type and each such forward shoe is therefore subject to one-half the wear of the conventional type's forward shoe and the lining on each such forward shoe will, therefore, last twice as long. Thus, a very desirable result is achieved.

It should also be noted that this embodiment can be so designed that it produces a combination of the results above outlined, that is, it can be designed so that in forward motion all the shoes will produce equal torques while, at the same time, the aggregate torque in both forward and reverse motion is the same for any given aggregate actuating force. To accomplish this, however, linings of low frictional coefficients must be used. For example, when employing three 115° symmetrical shoes, with lining coefficients of .22 the pivot axis ratio would have to be about .76 (.76428) in order to achieve this result and if linings with a coefficient of .25 were used the pivot axis ratio would have to be about .87 (.8685).

It should be understood that I do not wish to limit myself to the particular embodiment of the above type which I referred to as the preferred embodiment, nor do I wish to limit myself to the other contemplated designs described. One of the chief advantages of this general type where a majority of shoes are similarly actuated is that it lends itself to almost any contemplated design in order to achieve a multitude of desired results. Thus, any of the specifications given for this type may be followed or such specifications may be modified to produce any desired results. Thus, this species can be modified to include any of the types above outlined or it can be further modified to effect a compromise anywhere in between or modified in various other ways to accomplish divers results. It should also be noted that I do not limit myself to the use of three shoes as any greater number may be used. To achieve any desired results, each type would have to be individually designed and the number of shoes to be similarly actuated or oppositely actuated would depend on the results desired. If it should be desired to achieve equal torques in both forward and reverse motion then regardless of the number of shoes employed, the following rule may be given: If all the shoes have similar characteristics (as above defined), whether assisted or opposed, then the total actuating force must be so divided that the aggregate equivalent actuating forces on all the assisted shoes will equal the aggregate equivalent actuating forces on all the opposed shoes, and, if the actuating points are respectively similar on all shoes and the cylinders respectively similarly positioned, then the aggregate areas of all the pistons acting on the assisted shoes must equal the aggregate areas of all the pistons acting on the opposed shoes.

Figs. 7 and 8 illustrate another type of fluid actuated multi-shoe brake wherein the torques obtained in forward and reverse motion are equal. I prefer to use fluid cylinders instead of cams mounted on fixed journals as the braking torque obtainable with such fluid cylinders is very much greater than would be obtainable with journaled cams, employing the same actuating force in each case. This is true regardless of how the cams themselves may be actuated. The reason for this is that if double surface journaled cams were used to actuate each pair of shoes, one assisted and one opposed, each of said shoes would be constrained to move equally and would produce equal torques. However, even if the cams have the same effective lift, the cam pressures or actuating forces due thereto will not be the same on both shoes. The cam pressure on the opposed shoe is much greater than on the assisted shoe as the cam has to overcome the negative torque due to the opposed shoe. In other words, since the journaled cam exerts more force on the opposed shoe, the reaction thereof, instead of being transmitted to the assisted shoe, is taken up by the opposite side of the journal and a great deal of the pedal effort is therefore, in effect, wasted. It must also be noted that the brake lining is somewhat compressible and the brake drum and other parts somewhat flexible and susceptible of deflection under pressure. The frictional forces in the forward or assisted shoe tend to swing it into closer contact with the drum but with the fixed journal cam, the cam or actuating force is unable to follow up this motion and assist, without additional pedal effort, in building up this pressure. The degree of increase in torque produced by my type over a fixed journal type would depend on the particular shoe characteristics employed. It is safe to say that with the average characteristics, the excess would be well in excess of 25% for the same actuating force. If we add to this the amount of force conserved by the elimination of friction between the cam surfaces and the shoes, the results are even better. This type could also be designed so that the members of a similarly actuated pair of shoes would be diametrically opposite instead of adjacent as shown. This procedure would be more effective in overcoming brake drum distortion. The actuating force could also be distributed other than equally between the shoes to produce other desired results.

The embodiment in Figs. 9 and 10 is intended to accomplish substantially the same results as the preferred embodiment depicted in Fig. 5, but it is not quite as efficient as the latter. Instead of having one opposed shoe subtending approximately one-third of the circumference as in Fig. 5, this shoe has in effect been divided into two shorter opposed shoes, so that the actuating force on all shoes may now be equal. With any given coefficient of friction and pivot axis ratio, the contact lengths of the various shoes may be designed to give any desired results, preferably equal aggregate torques in both forward and reverse motion. By changing the distribution of the actuating force (as by changing the relative piston diameters) or by modifying the various shoes characteristics any other desired results may be achieved, as, for example, greater forward torque than reverse torque. In this type, also, the service obtainable between relinings is much greater than in the conventional type. This type is also very effective in overcoming brake drum distortion. It should be noted that, in this type, if the actuating force is equally divided between the shoes and if the pivot axis ratio is the same for all shoes as shown, and if the lining coefficient is the same on all shoes, should it be desired to secure the same aggregate braking torque in both forward and reverse motion for any given initial actuating force, it will generally be necessary to have the combined contact lengths of both shorter opposed shoes somewhat larger than the contact length of one of the longer assisted shoes; in other words, the contact length of each of the shorter shoes would generally have to be slightly more than one-half the length of either one of the longer assisted shoes. However, some of the other shoe characteristics can be varied to achieve the same results.

It should be noted that even if a brake shoe is perfectly symmetrical when new it will become somewhat unsymmetrical as its lining or contact surface wears down due to the geometrical constraint under which the shoe moves about its pivot axis, and this is particularly true where the ends of the contact surfaces are along substantially radial lines. Furthermore, it is possible so to design the shoe that, even when new, it is somewhat unsymmetrical without appreciably affecting the results. For these reasons, the term "substantially symmetrical" is used.

Of course it will be understood that various modifications may be made in the construction and arrangement of parts without departing from the spirit of the invention as claimed.

I claim:

1. A friction brake having relatively fixed and movable parts, three brake shoes operatively associated with said fixed part and adapted to frictionally engage said movable part, said shoes having rigid oblique extensions from the ends thereof, said shoes being self-actuated during a given directional movement of said engaged movable part, and means including fluid cylinders for simultaneously operating said shoes by said extensions at points within the sectors of the engaging portions of adjacent shoes.

2. A friction brake having relatively fixed and movable parts, three brake shoes operatively associated with said fixed part and adapted to frictionally engage said movable part, said shoes having rigid oblique extensions from the ends thereof, said shoes being self-actuated during a given directional movement of said engaged movable part, and individually operated fluid means operatively associated with and for operating each of said shoes by said extensions at points within the sectors of the engaging portions of adjacent shoes.

3. A friction brake having relatively fixed and movable parts, three brake shoes operatively associated with said fixed part and adapted to frictionally engage said movable part, two of said shoes having positive self-actuation in a given direction of movement of said engaged movable part and one of said shoes having negative self-actuation in the same direction of movement of said engaged movable part, the aggregate arcuate lengths of the engaging surfaces of said shoes having positive self-actuation being greater than the aggregate arcuate lengths of the engaging surfaces of said shoe having negative self-actuation, and fluid operated means operatively associated with and for independently operating each of said shoes simultaneously.

4. A friction brake having relatively fixed and movable parts, three brake shoes operatively associated with said fixed part and adapted to frictionally engage said movable part, only two of said shoes having positive self-actuation during a given directional movement of said engaged movable part, and one being self-actuated upon opposite movement, and individual fluid operated means operatively associated with and for actuating each of said shoes.

5. A friction brake having relatively fixed and movable parts, more than two brake shoes operatively associated with said fixed part and adapted to frictionally engage said movable part, and more than two fluid operated motors pivotally connected to said fixed part for operating said shoes, said fluid operated motors having axes substantially intersecting the axes of their respective pivotal connections.

6. A friction brake having a brake drum, a fixed part, more than two brake shoes adapted to frictionally engage said brake drum, and, for actuating said shoes, more than two fluid operated motors pivotally connected to said fixed part and having axes substantially along chords of said brake drum, said axes substantially intersecting the axes of the respective pivotal connections.

7. A friction brake having relatively fixed and rotatable parts, more than two brake shoes pivotally connected to said fixed part and adapted to frictionally engage said rotatable part, and more than two fluid operated motors pivotally connected to said fixed part and operatively associated with and for operating said shoes, said fluid operated motors being located within the sectors of the engaging surfaces of shoes with which they are not operatively associated, and having axes substantially along chords of said rotatable part, said axes substantially intersecting the respective pivot axes of said fluid operated motors.

8. A friction brake having relatively fixed and movable parts, a plurality of brake shoes adapted to frictionally engage said movable part, and a fluid operated motor operatively associated with and for operating each of said shoes, each of said shoes having a pivotal connection located within the sector of the engaging surface of another shoe, and each of said motors having a pivotal connection located within the sector of the engaging surface of a shoe with which it is not operatively associated.

9. A friction brake having a brake drum, a fixed part, more than two brake shoes having arcuate contact surfaces adapted for frictional engagement with said brake drum, each shoe being pivotally connected to said fixed part, each shoe being substantially symmetrical so that a brake drum radius bisecting the arcuate length of its contact surface is substantially at right angles to a brake drum radius passing through its pivot axis, and more than two pivotally mounted fluid operated motors operatively associated with and for operating said shoes at points beyond the toe ends of the engaging surfaces thereof, the pivotal mounting of each of said motors being located within the sector of the engaging surface of a shoe adjacent to the one with which it is operatively associated, each of said motors having an axis substantially intersecting the axis of its pivotal mounting, the axis of each of said motors being also substantially along a chord of the brake drum and substantially at right angles to the lever arm of its associated shoe passing through the point of actuation.

10. A friction brake having a brake drum, a fixed part, more than two brake shoes having arcuate contact surfaces adapted to frictionally engage said brake drum, each shoe being pivotally connected to said fixed part by means of extension arms straddling said fixed part, each shoe being substantially symmetrical so that a brake drum radius bisecting the arcuate length of the contact surface is substantially at right angles to a brake drum radius passing through the axis of the pivotal connection, each end of the contact surface of each shoe being circumferentially adjacent to the end of the contact surface of another shoe, each shoe having extensions at both ends extending angularly beyond the ends of the contact surfaces so that, with respect to each two shoes whose contact surface ends are circumferentially adjacent, the extensions of one of said shoes straddle the extension of the other of said shoes, each of said shoes being also laterally substantially symmetrical on both sides of a central plane bisecting the width of the contact surfaces thereof, said central plane also bisecting the width of the fixed part, and individual fluid operated motors operatively associated with and for operating each of said shoes at points beyond the toe ends of the engaging surfaces thereof, each of said fluid operated motors having a pivotal connection located within the sector of the engaging surface of a shoe adjacent to the one with which it is operatively associated, each of said fluid operated motors having an axis substantially intersecting the axis of its pivotal connection, the axis of each of said fluid operated motors being also substantially along a chord of the brake drum and substantially at right angles to the lever arm of its associated shoe passing through the point of actuation.

11. A friction brake having a cylindrical brake drum, a relatively fixed part within said drum, at least three substantially symmetrical internal brake shoes having pivotal axes on said fixed part and having toe ends and heel ends and having arcuate contact surfaces to frictionally engage the interior of said brake drum, each end of the contact surface of each shoe being circumferentially adjacent to the end of the contact surface of another shoe, each shoe having inwardly extending connections slightly inclined away from the periphery from adjacent the toe and heel ends thereof and also extending from said toe and heel ends into the sectors of the next adjacent shoes, the connections from each of said heel ends being provided with pivotal mounts on said fixed part at said pivotal axes, and individual fluid operated motors, one for each shoe, connected to the ends of the toe connections, the axes of the motors being substantially aligned with the axes of the toe connections and said fluid motors being provided with pivotal mounts on said fixed part, said last mentioned pivotal mounts being substantially transverse to and intersecting the axes of said motors.

12. A friction brake having a cylindrical brake drum, a relatively fixed support within said drum, three internal brake shoes having pivotal axes on said fixed support and having toe ends and heel ends and having arcuate contact surfaces to frictionally engage the interior of the brake drum, the said arcuate contact surfaces of said shoes extending from points between 20° and 40° remote from the respective pivotal axes of said shoes to points between 140° and 160° from said pivotal axes of said shoes, each shoe having inwardly extending connections slightly inclined away from the periphery from adjacent the toe and heel ends thereof and also extending from said toe and heel ends into the sectors of the next adjacent shoes, the connections from each of said heel ends being provided with pivotal mounts on said fixed support at said pivotal axes, and individual fluid operated means connected to actuate said shoes.

13. A friction brake having a cylindrical brake drum, a relatively fixed support within said drum, three internal brake shoes, each having a separate pivotal axis on said fixed support, said shoes having toe ends and heel ends and having arcuate contact surfaces adapted to frictionally engage the interior of the brake drum, each of said arcuate contact surfaces being between 100° and 120° in length, the heel end of each contact surface being no less remote than 20° from its pivotal axis and no more than 40° from its pivotal axis, each shoe having inwardly extending connections slightly inclined away from the periphery from adjacent the toe and heel ends thereof and also extending from said toe and heel ends into the sectors of the next adjacent shoes, the connections from each of said heel ends being provided with pivotal mounts on said fixed support at said pivotal axes, and individual fluid operated motors, one for each shoe.

14. A friction brake having a cylindrical brake drum, a relatively fixed support within said drum, at least three internal brake shoes having pivotal axes on said fixed support and having toe ends and heel ends and having arcuate contact surfaces adapted to frictionally engage the interior of the brake drum, the centers of the arcuate lengths of said shoes being between 80° and 100° remote from the respective pivotal axes of said shoes, each shoe having inwardly extending connections slightly inclined away from the periphery from adjacent the toe and heel ends thereof and also extending from said toe and heel ends into the sectors of the next adjacent shoes, the connections from each of said heel ends being provided with pivotal mounts on said fixed support at said pivotal axes, individual fluid operated motors, one for each shoe, and means for simultaneously actuating said motors.

15. A friction brake having a rotatable brake drum, a relatively fixed part, a brake shoe operatively associated with said fixed part and adapted for frictional engagement with said brake drum, and a fluid operated motor operatively associated with and for operating said brake shoe, said motor being pivotally connected to said fixed part and having an axis substantially intersecting the axis of said pivotal connection, said motor being also pivotally connected to said brake shoe.

16. A friction brake having a rotatable part, a relatively fixed part, three brake shoes operatively associated with said fixed part and adapted for frictional engagement with said rotatable part, two of said shoes being self-actuated in one direction and the third shoe being self-actuated in the other direction of rotation of said rotatable part when said shoes are in engagement therewith, and fluid operated motors operatively associated with and for operating each of said shoes, the motor for operating said third shoe being larger than either of the motors associated with the first mentioned two shoes.

17. A friction brake having a rotatable part, a relatively fixed part, three brake shoes operatively associated with said fixed part and adapted for frictional engagement with said rotatable part, two of said shoes being self-actuated in one direction and the third being self-actuated in the other direction of rotation of said engaged rotatable part, and individual fluid operated motors operatively associated with and for operating each of said shoes, said motors having pistons, the piston of the motor associated with said third shoe having an effective area substantially twice as large as the effective area of either one of the pistons of the respective motors associated with said first two shoes and substantially equivalent to the combined effective areas of the pistons of said first two shoes.

18. In a friction brake of the class described, a circular brake drum, a relatively fixed part, three brake shoes, each pivotally mounted on said fixed part, said shoes having arcuate contact surfaces in substantially the same circumferential path adapted for frictional engagement with said brake drum, each of said arcuate contact surfaces being between 100° and 120° in length, the end of each contact surface nearest the respective pivot axis of such shoes being no less than 20° remote from said pivot axis, and fluid operated motors for operating said shoes, said fluid operated motors being pivotally connected to said fixed part and having axes substantially intersecting the axes of the respective pivotal connections.

19. A friction brake comprising a rotatable cylindrical brake drum, a relatively fixed support inside of said drum, three internal brake shoes positioned successively in substantially the same rotational path within said brake drum, said shoes having arcuate contact portions to engage the interior of said drum arranged substantially in the same circumferential path, each brake shoe having a pivotal connection and an actuating connection extending from adjacent the ends of the shoe, the connections of one shoe extending in opposite directions respectively into the sectors of the contact portions of the second and third shoes, the connections of the second shoe extending in opposite directions respectively into the sectors of the contact portions of the first and third shoes, and the connections of the third shoe extending in opposite directions respectively into the sectors of the contact portions of the first and second shoes, one connection of each shoe at its end away from the shoe being provided with a pivot mount on said support in the sector of the contact portion of one adjacent shoe and the other connection at its end away from the shoe being provided with a fluid operated motor in the sector of the contact portion of the other adjacent shoe, the pivot mount and the motor of each shoe being approximately diametrically opposite, and means to operate all of said motors simultaneously.

20. In a friction brake, a cylindrical brake drum, a fixed part, and three brake shoes positioned successively in substantially the same circumferential path within said brake drum, said brake shoes having substantially arcuate contact portions adapted for internal engagement with said brake drum, each brake shoe having a pivot connection at one end extending into the sector of the contact portion of one adjacent shoe, and an operating connection at the other end extending into the sector of the contact portion of the other adjacent shoe, the pivot connections on all shoes having independent and separate pivot mounts on said fixed part, at least two fluid operated actuating motors located internally within said brake drum and connected to said operating connections to actuate said shoes, said motors being located substantially within the sectors of the contact portions of the shoes adjacent to the shoes which they actuate and said motors being located approximately diametrically opposite the pivot mounts of the pivot connections of the shoes which they operate, all of said motors being provided with means to operate them simultaneously.

21. In a multi-shoe friction brake construction, a cylindrical brake drum, at least three internal shoes having toe and heel portions, and also having arcuate contact portions arranged in substantially the same circumferential path to contact the interior of said drum over the internal circumference thereof, and further having connections from adjacent the toe and heel portions extending substantially into the sectors of the arcuate contact portions of the next adjacent shoes, a relatively fixed support within said drum, the connections from said heel portions being provided with pivotal mountings on said fixed support adjacent the ends of the connections away from the shoes, and actuating means to operate said shoes simultaneously, said last mentioned means actuating said toe connections adjacent the ends of said connections away from said shoes, said actuating means including fluid operated motors for independently operating each shoe.

22. In a multi-shoe friction brake construction, a cylindrical brake drum, at least three internal shoes having toe and heel portions, and also having arcuate contact portions arranged in substantially the same circumferential path to contact the interior of said drum over the internal circumference thereof, and further having connections from adjacent the toe and heel portions extending substantially into the sectors of the arcuate contact portions of the next adjacent shoes, a relatively fixed support within said drum, the connections from said heel portions being provided with pivotal mountings on said fixed support adjacent the ends of the connections away from the shoes, and actuating means to operate said shoes simultaneously, said last mentioned means actuating said toe connections adjacent the ends of said connections away from said shoes, said actuating means including fluid operated cylinder-piston combinations pivotally connected to said toe connections.

23. In a multi-shoe friction brake construction, a cylindrical brake drum, at least three internal shoes having toe and heel portions, and also having arcuate contact portions arranged in substantially the same circumferential path to contact the interior of said drum over the internal circumference thereof, and further having connections from adjacent the toe and heel portions extending substantially into the sectors of the arcuate contact portions of the next adjacent shoes, a relatively fixed support within said drum, the connections from said heel portions being provided with pivotal mountings on said fixed support adjacent the ends of the connections away from the shoes, and actuating means to operate said shoes simultaneously, said last mentioned means actuating said toe connections adjacent the ends of said connections away from said shoes, all of said shoes being self actuated in the same direction of rotation.

24. In a multi-shoe friction brake construction, a cylindrical brake drum, at least three internal shoes having toe and heel portions, and also having arcuate contact portions arranged in substantially the same circumferential path to contact the interior of said drum over the internal circumference thereof, and further having connections from adjacent the toe and heel portions extending substantially into the sectors of the arcuate contact portions of the next adjacent shoes, a relatively fixed support within said drum, the connections from said heel portions being provided with pivotal mountings on said fixed support adjacent the ends of the connections away from the shoes, and actuating means to operate said shoes simultaneously, said last mentioned means actuating said toe connections adjacent the ends of said connections away from said shoes, a majority of said shoes being self actuated in one rotational direction and a minority being self actuated in the opposite rotational direction.

GUSTAV MATTERSDORF.